United States Patent [19]

Rundell

[11] Patent Number: 4,527,818
[45] Date of Patent: Jul. 9, 1985

[54] COUPLING FOR PIPE OR TUBING

[75] Inventor: Herbert A. Rundell, Houston, Tex.

[73] Assignee: Texaco Inc., White Plains, N.Y.

[21] Appl. No.: 510,485

[22] Filed: Jul. 5, 1983

Related U.S. Application Data

[63] Continuation of Ser. No. 234,295, Feb. 17, 1981, abandoned.

[51] Int. Cl.³ .................................................. F16L 23/00
[52] U.S. Cl. ..................................... 285/174; 285/367; 285/381; 285/411; 285/DIG. 12; 285/DIG. 18
[58] Field of Search ............... 285/367, 411, DIG. 18, 285/366, 365, 408, 407, 381, DIG. 12, 174

[56] References Cited

U.S. PATENT DOCUMENTS

| | | | |
|---|---|---|---|
| 222,388 | 12/1879 | Doty | 285/DIG. 18 X |
| 858,463 | 7/1907 | Matchette et al. | 285/411 X |
| 2,307,440 | 1/1943 | Wilson | 285/DIG. 18 X |
| 2,460,984 | 2/1949 | Hill et al. | 285/367 X |
| 2,898,000 | 8/1959 | Hanny | 277/236 X |
| 3,359,018 | 12/1967 | Simons | 285/367 |
| 3,575,432 | 4/1971 | Taylor | 285/367 |
| 3,589,751 | 6/1971 | Esnaud | 285/381 X |
| 3,669,474 | 6/1972 | Bode | 285/365 X |
| 4,106,798 | 8/1978 | Haug | 285/367 X |
| 4,135,741 | 1/1979 | Albertsen | 285/381 X |
| 4,297,779 | 11/1981 | Melton et al. | 285/381 X |

FOREIGN PATENT DOCUMENTS

| | | | |
|---|---|---|---|
| 870347 | 3/1953 | Fed. Rep. of Germany | 285/367 |
| 1194658 | 6/1965 | Fed. Rep. of Germany | 285/367 |
| 722912 | 3/1932 | France | 285/367 |
| 1380373 | 10/1964 | France | 285/365 |
| 29358 | of 1909 | United Kingdom | 285/381 |

*Primary Examiner*—Thomas F. Callaghan
*Attorney, Agent, or Firm*—Robert A. Kulason; Henry C. Dearborn

[57] ABSTRACT

A coupling especially for connecting pipe or tubing that must not be subjected to torque as connections are made, or afterward. It includes a connector for each of the pipe ends that has a socket to receive the pipe and an extension with a flanged tip. There is a split ring clamp to hold two of the flanged tips together in butting relationship and a hose clamp holds the split ring clamp in place.

1 Claim, 5 Drawing Figures

U.S. Patent    Jul. 9, 1985    4,527,818
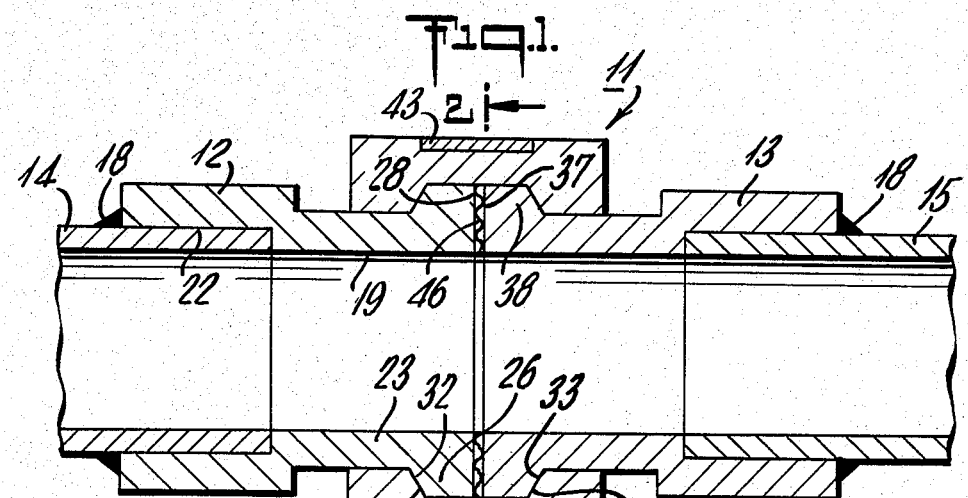
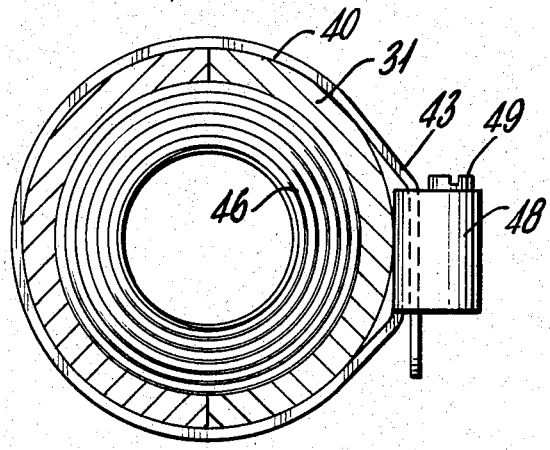
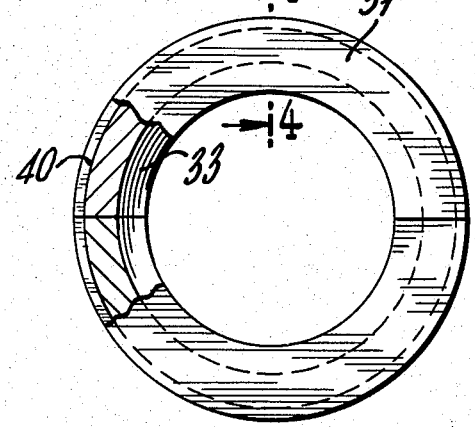
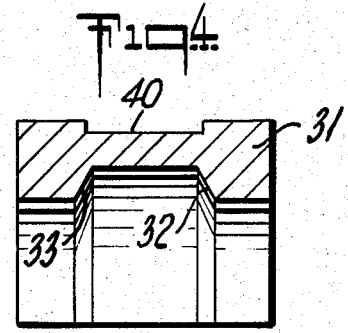
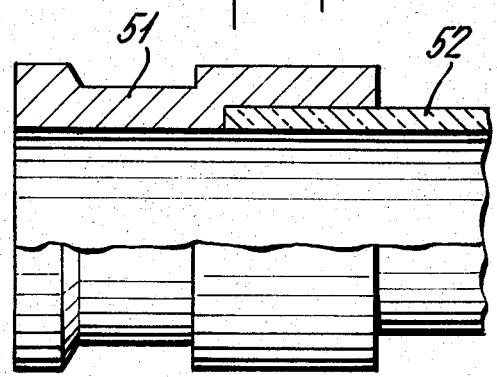

COUPLING FOR PIPE OR TUBING

This is a continuation of application Ser. No. 234,295, filed Feb. 17, 1981 and now abandoned.

BACKGROUND OF THE INVENTION

1. Field of the Invention

This invention concerns structure of a coupling for pipe or tubing, in general. More specifically, it relates to a special coupling structure that is particularly applicable to the situation encountered in deep well operations where no torque or rotation may be applied during connection of the separate pipes or tubing sections nor during their use in the well.

2. Description of the Prior Art

While there are numerous pipe coupling or pipe joining structures heretofore known, none of them provides structure that is especially applicable to the situation where sections of pipe or tubing are to be coupled together and used in a deep well operation which must not have any of the pipes or tubings subjected to torque. The no torque restriction holds both during connection and during use downhole in the well. Some of the prior known coupling or joining structures are shown and described in one or more of the following U.S. patents, i.e. U.S. Pat. NOs. 1,622,768, H. D. Cook et al, Mar. 29, 1927; 1,851,574, F. Fiederlein, Mar. 29, 1932; 1,857,297, C. W. Faulkner, May 10, 1932; and 2,035,221, G. S. Cleghorn, Mar 24, 1936. Those prior structures involve machining or otherwise shaping the ends of the pipes that are to be coupled together. And, for that and other reasons they would not be suitable for use in the manner that this invention calls for.

SUMMARY OF THE INVENTION

Briefly, the invention concerns a coupling for pipe or tubing used in deep well operations wherein no torque or rotation is applied during connection or use in the well. It comprises a connector for each end of a pair of pipes to be joined, and the said connector comprises socket means for receiving a pipe end and extension means having a flanged tip. The coupling also comprises a split ring clamp for cooperating with two of said flanged tips to hold them in butting relationship, and means for encircling and applying radial pressure to said split ring clamp.

Again briefly, the invention concerns a coupling for pipe or tubing used in deep well operations wherein no torque or rotation is applied during connection or use in the well. It comprises (1) a connector for each end of a pair of pipes to be joined. The said connector comprises (a) an axial bore having the same inside diameter as said pipe, (b) a socket at one end for receiving an end of said pipe, (c) an extension at the other end having a flanged tip, and (d) said flanged tip having an axially tapered shoulder and a transverse planar surface. The coupling also comprises (2) a split ring clamp which in turn comprises (a) a pair of axially tapered inside surfaces for cooperating with a pair of said flanged tip axially tapered shoulders to apply an axial force toward each of said transverse planar surfaces, and (b) a peripheral shallow groove located centrally on the outside of said split ring clamp. It also comprises (3) a hose clamp for encircling said split ring clamp in said shallow groove for applying radial pressure against said split ring clamp. Finally, it comprises (4) a corrugated gasket located between said transverse planar surfaces for creating a seal at said coupling.

BRIEF DESCRIPTION OF THE DRAWINGS

The foregoing and other objects and benefits of the invention will be more fully set forth below in connection with the best mode contemplated by the inventor of carrying out the invention, and in connection with which there are illustrations provided in the drawings, wherein:

FIG. 1 is a schematic longitudinal cross section illustrating a coupling according to the invention;

FIG. 2 is a transverse cross section taken along the lines 2—2 of FIG. 1;

FIG. 3 is an end elevation partly broken away in cross section showing the split ring clamp by itself;

FIG. 4 is a transverse cross section taken along the lines 4—4 on FIG. 3; and

FIG. 5 is a side elevation partly in cross section illustrating one of the connectors that together make the coupling illustrated in FIG. 1, but showing it attached on a ceramic pipe or tubing.

DESCRIPTION OF THE PREFERRED EMBODIMENTS

It has been found that in certain deep well operations, e.g. where the formation downhole is to be heated using radio frequency heater elements with the melted petroleum products to be pumped or otherwise carried to the surface, the operations involve the use of pipe or tubing that must be coupled together without the use of any torque as joints of the pipe are coupled together. In addition, after the sections of pipe have been coupled, no torque is applied or rotation given to the string of pipe which extends down into the hole. Under such conditions, a coupling structure according to this invention has been found to be highly satisfactory.

With reference to FIGS. 1-4, it will be noted that a complete coupling 11 is illustrated in FIG. 1. It includes a pair of separate connectors 12 and 13. One is attached to each end of a pipe 14 and a pipe 15, respectively. In this instance, the pipes 14 and 15 are metallic and are attached to the connectors 12 and 13 in any feasible manner, e.g. by welding as indicated by the reference numerals 18.

Connector 12 has an axial bore 19 that has the same inside diameter as the inside diameter of the pipe 14. There is a socket 22 at one end of the connector 12, which socket is for receiving the end of the pipe 14. The connector 12 also has an extension 23 at the other end from the socket 22. And, there is a flanged tip 26 at the extremity of the extension 23.

The flanged tip 26 has an axially tapered shoulder 27 on the inside edge of the tip 26. And, there is a transverse planar surface 28 at the outside edge of the tip 26.

There is a split ring clamp 31 that has a pair of axially tapered inside surfaces 32 and 33 which cooperate with the tapered shoulder 27 and a similar tapered shoulder 36 on the other connector 13 to apply an axial force toward the planar surface 28 (on connector 12) and so tending to move a corresponding planar surface 37 on a tip 38 of the connector 13 toward the corresponding planar surface 28.

The split ring clamp 31 has a peripheral shallow groove 40 that is located centrally on the outside of the split ring clamp 31. This shallow groove 40 accommodates a hose clamp 43 that encircles the split ring clamp 31 and is retained in the shallow groove 40.

It will be understood that split ring clamp 31 is made up of two halves which may be formed by cutting it on a diameter with an appropriate width saw blade. This may be done after forming the groove 40 and the tapered inside surfaces 32 and 33 by appropriate machining.

Various types of seal element might be employed at the abutting faces of the planar surfaces 28 and 37. But, it is preferred to employ a corrugated gasket 46 which is preferably made of 316 stainless steel when the split ring clamp 31 is made of a material such as 17-4 PH stainless steel. Such a gasket structure is beneficial in having a coefficient of thermal expansion which is high in comparison with that of the split ring clamp 31. Consequently, the joint at the coupling will tighten itself under high temperatures which will be encountered downhole.

It will be understood that the hose clamp 43 may be a conventional type structure. While it might take somewhat different forms, the form illustrated in FIG. 2 has a short housing 48 that incorporates a screw 49 in order to apply the tightening tension force to the strap portion of hose clamp 43. It may be noted that there is no difficulty with employing this type of clamp structure (i.e. a hose clamp) to hold the split ring clamp 31 since the hose clamp 43 presents a smooth surface for well over 180° of the outer surface.

FIG. 5 illustrates a connector 51 which is substantially the same as the connectors 12 and 13. However, in this instance it is designed for attachment to a ceramic pipe or tube 52. Consequently, instead of attaching the pipe 52 to the connector 51 by welding, it is attached by employing a shrink fit.

While particular embodiments of the invention in accordance with the applicable statutes have been described in considerable detail above, this is not to be taken as in any way limiting the invention but merely as being descriptive thereof.

I claim:

1. Coupling for pipe or tubing used in deep well operations wherein no torque or rotation is applied to said pipe during connection or use in the well, comprising in combination
    (1) a pair of ceramic pipes to be joined,
    (2) a cylindrical connector for each end of said pair of ceramic pipes to be joined, said connector comprising
        (a) a cylindrical collar having an axial bore said bore having the same inside diameter as said ceramic pipe,
        (b) a socket in said cylindrical collar having inside diameter for making a shrink fit and located at one end of said collar for receiving an end of said pipe for making said shrink fit,
        (c) a cylindrical extension at the other end of said connector from said collar and having a flanged tip,
        (d) said flanged tip having an outside diameter the same as said collar outside diameter and an axially tapered shoulder,
        (e) said flanged tip also having a transverse planar surface extending the fill radial with of said tip,
    (3) a two piece split ring clamp made of 17-4 PH stainless steel, comprising
        (a) a pair of axially tapered inside surfaces for cooperating with a pair of said flanged tip axially tapered shoulders in order to apply an axial force toward each of said transverse planar surfaces, and
        (b) a peripheral shallow groove located centrally on the outside of both pieces of said split ring clamp,
    (4) a hose clamp for encircling said split ring clamp and located in said shallow groove for applying radial pressure against said split ring clamp, and
    (5) a corrugated gasket made of 316 stainless steel for having a coefficient of thermal expansion higher than said 17-4 PH stainless steel and located between said transverse planar surfaces for creating a seal at said coupling, and whereby torqueless coupling of ceramic pipes may be made having superior tight coupling under high temperature conditions down hole.

* * * * *